(12) United States Patent
Buchman et al.

(10) Patent No.: US 11,379,146 B1
(45) Date of Patent: Jul. 5, 2022

(54) METHOD AND SYSTEM FOR PERFORMING DATA PROTECTION MANAGEMENT USING AN ADD-ON APPLICATION PROGRAMMING INTERFACE

(71) Applicant: EMC IP Holding Company LLC, Hopkinton, MA (US)

(72) Inventors: Matthew Dickey Buchman, Seattle, WA (US); Yasemin Ugur-Ozekinci, Oakville (CA); Jayashree B. Radha, Bangalore (IN); Kenneth William Owens, Burlington (CA); Adrian Dobrean, Oakville (CA); Krishnendu Bagchi, Bangalore (IN); Navneet Upadhyay, Ghaziabad (IN); Pawan Singh, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 10 days.

(21) Appl. No.: 17/160,365

(22) Filed: Jan. 27, 2021

(51) Int. Cl.
*G06F 3/06* (2006.01)
*G06F 9/54* (2006.01)

(52) U.S. Cl.
CPC ............ *G06F 3/065* (2013.01); *G06F 3/0619* (2013.01); *G06F 3/0673* (2013.01); *G06F 9/541* (2013.01)

(58) Field of Classification Search
CPC ...... G06F 3/065; G06F 3/0619; G06F 3/0673; G06F 9/541
See application file for complete search history.

(56) References Cited

U.S. PATENT DOCUMENTS

| | | | |
|---|---|---|---|
| 10,423,583 B1* | 9/2019 | Dobrean | G06F 16/2246 |
| 10,949,038 B2* | 3/2021 | Gwon | H01L 51/5253 |
| 2020/0348846 A1* | 11/2020 | Chopra | G06F 3/0619 |
| 2020/0387321 A1* | 12/2020 | Bansal | G06F 3/0617 |
| 2021/0133039 A1* | 5/2021 | Behera | G06F 11/1469 |
| 2021/0133043 A1* | 5/2021 | Khan | G06F 11/1461 |

\* cited by examiner

*Primary Examiner* — Hiep T Nguyen
(74) *Attorney, Agent, or Firm* — Chamberlain, Hrdlicka, White, Williams & Aughtry

(57) ABSTRACT

A system for providing data protection services for data generated by host components hosted by hosts includes persistent storage for storing data and a local data protection manager. The local data protection manager identifies a data protection trigger event associated with a host component hosted by the host, identifies an add-on library associated with the host component, identifies a data protection agent associated with the host component, and initiates performance of data protection services by the data protection agent using the add-on library.

20 Claims, 9 Drawing Sheets

METHOD AND SYSTEM FOR PERFORMING DATA PROTECTION MANAGEMENT USING AN ADD-ON APPLICATION PROGRAMMING INTERFACE

BACKGROUND

Devices may generate information based on existing information. For example, devices may obtain information and derive information based on the obtained information. To obtain information, devices may be able to communicate with other devices. The communications between devices may be through any means.

SUMMARY

In one aspect, a system for providing data protection services for data generated by host components hosted by hosts in accordance with one or more embodiments of the invention includes persistent storage for storing data and a local data protection manager. The local data protection manager identifies a data protection trigger event associated with a host component hosted by the host, identifies an add-on library associated with the host component identifies a data protection agent associated with the host component, and initiates performance of data protection services by the data protection agent using the add-on library.

In one aspect, a method for providing data protection services for data generated by host components hosted by hosts in accordance with one or more embodiments of the invention includes identifying a data protection trigger event associated with a host component hosted by the host, identifying an add-on library associated with the host component, identifying a data protection agent associated with the host component, and initiating performance of data protection services by the data protection agent using the add-on library.

In one aspect, a non-transitory computer readable medium in accordance with one or more embodiments of the invention includes computer readable program code, which when executed by a computer processor enables the computer processor to perform a method for providing data protection services for data generated by host components hosted by hosts in accordance with one or more embodiments of the invention. The method includes identifying a data protection trigger event associated with a host component hosted by the host, identifying an add-on library associated with the host component, identifying a data protection agent associated with the host component, and initiating performance of data protection services by the data protection agent using the add-on library.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for providing data protection services for hosts that host different types of host components. More specifically, embodiments of the invention relate to using an add-on application programming interface (API) and an add-on library to provide data protection services to host components. A local data protection manager may use the add-on API and an add-on library to translate generic data protection requests into host component specific data protection requests. This may enable a single data protection manager to efficiently provide data protection management services to multiple hosts each with different types of host components that may include different types of functionalities.

Figure 1A:
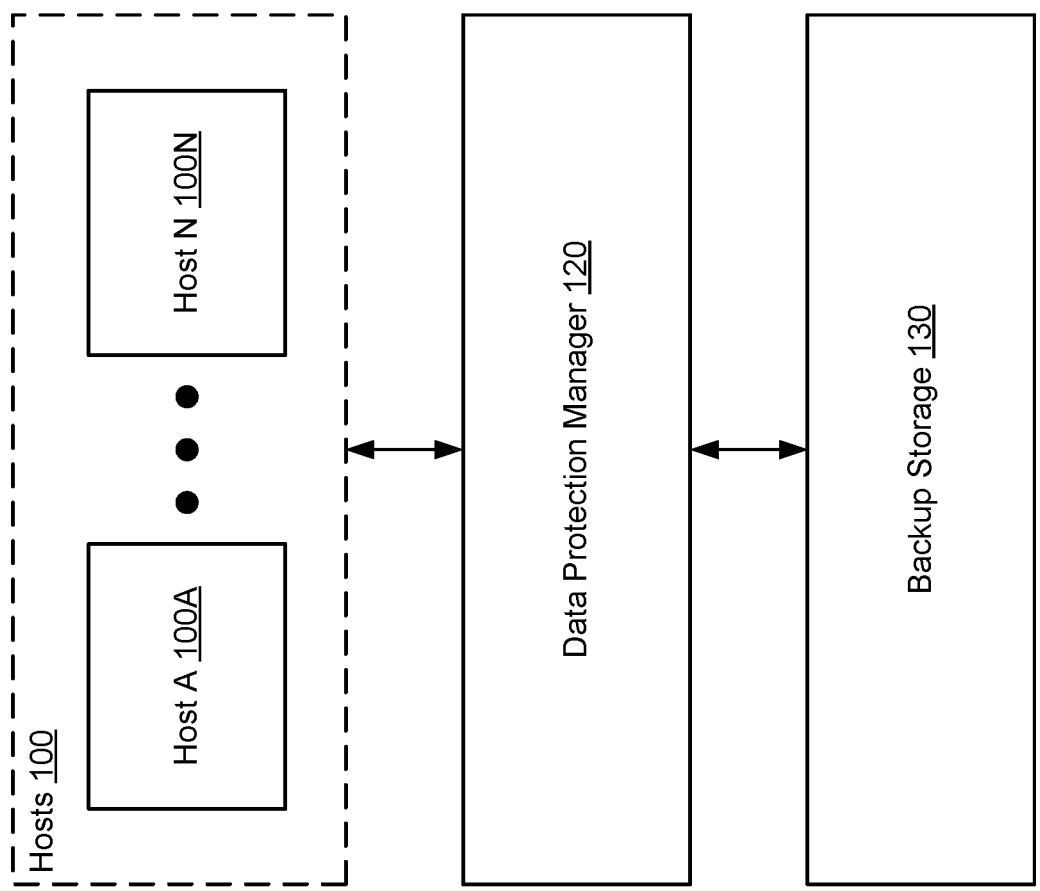
FIG. 1A shows a diagram of a system in accordance with one or more embodiments of the invention.

FIG. 1A shows a diagram of a system in accordance with one or more embodiments of the invention. The system may include hosts (100), a data protection manager (120), and a backup storage (130). The system may include one or more hosts (100), e.g., host A (100A) and host N (100N). The system may include additional, fewer, and/or different components without departing from the invention. Each component may be operably connected to any of the other components via any combination of wired and/or wireless connections. Each of the aforementioned components is discussed below.

In one or more embodiments of the invention, the hosts (100) provide services to clients (not shown) and generate data. The data may be of value to users of the hosts (100) and may therefore require data protection services to be provided to the data. The hosts (100) may obtain data protection management services from the data protection manager (120). To obtain the data protection management services, the hosts (100) may (i) obtain generic data protection requests from the data protection manager (120), (ii) provide the data protection manager (120) with information associated with host components (discussed below), and (iii) notify the data protection manager (120) when host components are added or removed from the hosts (100). The hosts (100) may also obtain backup storage services from the backup storage (130). The hosts (100) may include any number of hosts (e.g., 100A, 100N) without departing from the invention. The hosts may provide and/or obtain other and/or additional services, and/or include other and/or additional functionalities without departing from the invention. For additional information regarding the hosts (100), refer to FIG. 1B.

Figure 4:
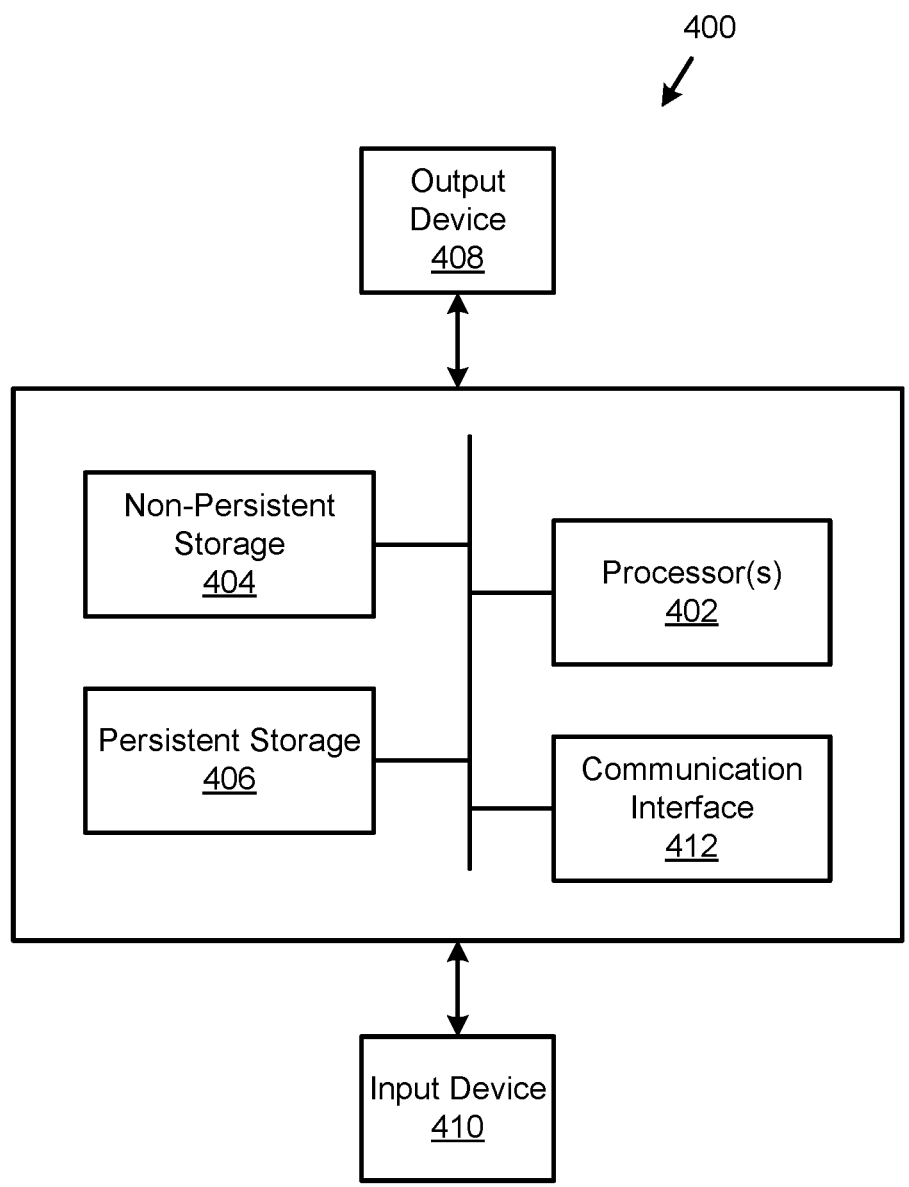
FIG. 4 shows a diagram of a computing device in accordance with one or more embodiments of the invention.

In one or more embodiments of the invention, each of the hosts (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a host (e.g., 100A) described throughout this application.

In one or more embodiments of the invention, each of the hosts (100) is implemented as a logical device. The logical device may utilize the computing resources of any number of computing devices and thereby provide the functionality of the hosts (100) described throughout this application.

In one or more embodiments of the invention, the data protection manager (120) includes the functionality to provide data protection management services to the hosts (100). The data protection management services may include generating generic data protection requests and providing generic data protection requests to the hosts (100). The data protection management services may include other and or additional services without departing from the invention. The data protection manager (120) may include other and/or additional functionalities without departing from the invention. For additional information regarding the data protection manager (120), refer to FIG. 1C.

In one or more embodiments of the invention, the data protection manager (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection manager (120) described throughout this application.

In one or more embodiments of the invention, the data protection manager (120) is implemented as a logical device. The logical device may utilize the computing resources of any number of computing devices and thereby provide the functionality of the data protection manager (120) described throughout this application.

In one or more embodiments of the invention, the backup storage (130) includes the functionality to provide backup storage services to the hosts (100). The backup storage services may include storing backups of data generated by the hosts (100) for data protection purposes and providing backups of data generated by the hosts (100) for restoration purposes. The backups may include copies of all and/or a portion of the data generated by the hosts (100). The backups may include any type of backups (e.g., full, incremental, sequential, synthetic, snapshots, etc.) without departing from the invention. A full backup may refer to a copy of all the data associated with an object generated during a single backup operation. An incremental backup may include a copy of only the data of an object that has changed since a previous backup was generated. A sequential backup (also referred to as differential backup) may be a backup of only the data of an object that has changed since the previous full backup. A synthetic backup may refer to a backup generated by merging a previously generated full backup and an incremental backup. A backup snapshot (also referred to as an image backup) may refer to a backup that includes the data necessary to restore an object (e.g., instance of an application) to a specific point in time.

The backup storage (130) may generate and provide backup metadata to the data protection manager. The backup metadata may be one or more data structures that include information associated with backups stored in the backup storage (130). The information may include storage location (e.g., a storage identifier and an address of the storage, etc.), a backup identifier (e.g., a unique combination of bits associated with a particular backup), a host identifier (e.g., a unique combination of bits associated with a particular host of the hosts (e.g., 100A)), and a host component identifier (e.g., a unique combination of bits associated with a particular host component). The backup metadata may be generated by the backup storage (130) and/or obtained from data protection agents of the hosts (100) without departing from the invention. The backup metadata may include other and/or additional information without departing from the invention. The backup storage (130) may include other and/or additional functionalities without departing from the invention.

In one or more embodiments of the invention, the backup storage (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage (130) described throughout this application.

In one or more embodiments of the invention, the backup storage (130) is implemented as a logical device. The logical device may utilize the computing resources of any number of computing devices and thereby provide the functionality of the backup storage (130) described throughout this application.

Figure 1B:
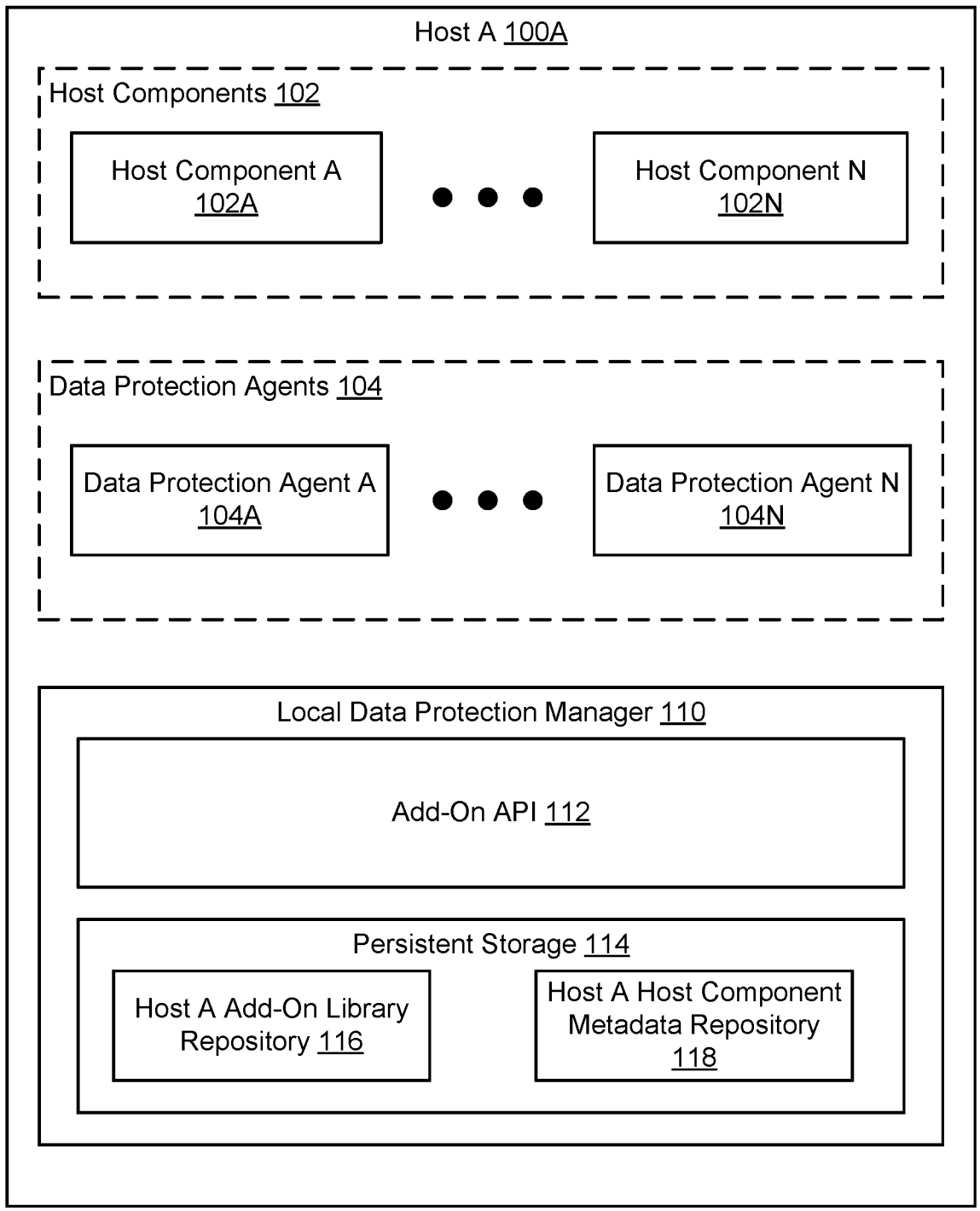
FIG. 1B shows a diagram of a host in accordance with one or more embodiments of the invention.

FIG. 1B shows a diagram of a host in accordance with one or more embodiments of the invention. Host A (100A) may be an embodiment of a host of the hosts (100, FIG. 1A) discussed above. As discussed above, host A (100A) provides services to clients (not shown). Host A (100A) may include host components (102), data protection agents (104), and a local data protection manager (110). Host A (100A) may include additional, fewer, and/or different components without departing from the invention. Each of the aforementioned components is discussed below.

In one or more embodiments of the invention, host components (102) perform services for clients (not shown). Host A (100A) may host one or more host components (102). There may be any number of host components (102) included on host A (100A) (e.g., host component A (102A) and host component N (102N)) without departing from the invention. The services may include writing, reading, and/or otherwise modifying data stored in host A (100A). The host components (102) may include the functionality to read and write data to host A (100A). The host components (102) may include other unique functionalities that may differ from one host component (e.g., 102A) to the other (e.g., 102N). These unique functionalities may include compatible backup generation techniques, host component topologies discovery, and other and/or additional unique functionalities without departing from the invention. Therefore, host components (102) may require specific and unique data protection services that may differ from between the host components (102). The host components may be, for example, database applications, email applications, file systems, and/or other and/or additional types of host components without departing from the invention. Host components may be added (i.e., installed) and removed (i.e., deleted) from host A (100A) by users of the system without departing from the invention.

The host components (102) may be implemented as computer instructions e.g., computer code, stored on a persistent storage of host A (100A) that when executed by a processor(s) of host A (100A), cause host A (100A) to provide the functionality of the host components (102) described throughout this application.

In one or more embodiments of the invention, the data protection agents (104) provide data protection services to the host components (102). The data protection services may include (i) generating and/or obtaining host component metadata, (ii) obtaining host component specific data protection requests (discussed below), (iii) generating backups of data generated by the host components (102) (*iv*) providing and obtaining backups to and from the backup storage (130, FIG. 1A), (v) restoring host components (102) using previously generated backups. Host A (100A) may include any number of data protection agents (e.g., data protection agent A (104A) and data protection agent N (104N)). Each data protection agent (e.g., 104A) may be associated with a particular host component (e.g., 102A), where the data protection agent (e.g., 104A) provides data protection services for that particular host component (e.g., 102A). Each data protection agent (e.g., 104A) may provide specific data protection services that may be different or performed in a different manner compared to that of other data protection agents (e.g., 104N) based on the unique functionalities of the host component (e.g., 102A) to which they are associated. The data protection agents (104) may include other and/or additional functionalities without departing from the invention.

In one or more embodiments of the invention, the data protection agents (104) are physical devices. The physical devices may include circuitry. The physical devices may be, for example, a field-programmable gate array, application specific integrated circuit, programmable processor, microcontroller, digital signal processor, or other hardware processor. The physical devices may be programmed to provide the functionality of the data protection agents (104) described throughout this application.

In one or more embodiments of the invention, the data protection agents (104) are implemented as computer instructions, e.g., computer code, stored on a persistent storage that when executed by a processor of host A (100A) causes host A (100A) to provide the functionality of the data protection agents (104) described throughout this application.

In one or more embodiments of the invention, the local data protection manager (110) includes the functionality to provide local data protection management services to host A (100A). The local data protection management services may include (i) discovering added and removed host components (102), (ii) maintaining a host A add-on library repository (116) and a host A host component metadata repository (118), (iii) obtaining generic data protection requests from the data protection manager (120, FIG. 1A), translating generic data protection requests to host component specific data protection requests, (iv) notifying the data protection manager (120, FIG. 1A) of the performance of data protection services, and (v) initiating the performance of data protection services by data protection agents (104). The local data protection manager (110) may include other and/or additional functionalities without departing from the invention.

In one or more embodiments of the invention, the local data protection manager (110) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the local data protection manager (110) described throughout this application.

In one or more embodiments of the invention, the local data protection manager (110) is implemented as computer instructions, e.g., computer code, stored on a persistent storage that when executed by a processor of host A (100A) causes host A (100A) to provide the functionality of the local data protection manager (110) described throughout this application.

In one or more embodiments of the invention, the local data protection manager (110) includes an add-on application programming interface, or an add-on API (112) and persistent storage (114). The local data protection manager (110) may include other and/or additional components without departing from the invention. Each of the aforementioned components is discussed below.

In one or more embodiments of the invention, the local data protection manager (110) uses the add-on API (112) to translate generic data protection requests into host component specific data protection requests. The add-on API (112)

may include the functionality to, through the use of add-on libraries included in the host A add-on library repository (116) (discussed below), translate generic data protection requests into host component specific data protection requests. The data protection agents (104) may not include the functionality to perform generic data protection requests and/or the data protection manager (120, FIG. 1A) may not include the functionality to generate and provide host component specific data protection requests. Therefore, the local data protection manager (110) uses the add-on API and the add-on libraries to implement data protection services specified by the data protection manager (120, FIG. 1A) via the unique functionalities of the host components (102) and the data protection agents (104).

For example, consider a scenario in which the data protection manager (120, FIG. 1A) sends two generic data protection requests to the local data protection manager (110), each specifying that a full backup at a particular point in time is to be taken of the data generated by two host components, host component A (102A) and host component N (102N). The local data protection manager (110) may further determine that a first add-on library is associated with host component A (102A) and second add-on library is associated with host component N (102N) using the host A host component metadata repository (118). The local data protection manager (110) may determine that data protection agent A (104A) is associated with host component A (102A) and data protection agent N (104N) is associated with host component N (102N) using the first and second add-on libraries. More specifically, the local data protection manager (110) may identify that data protection agent A (104A) is associated with host component A (102A) using the first add-on library (discussed below) associated with host component A (102A), where the first add-on library may specify that data protection agent A (104A) is associated with host component A (102A).

The local data protection manager (110) may use the add-on API (112) and the first add-on library to translate the generic data protection request associated with host component A (102A) into a host component specific data protection request, where the host component specific data protection request is a call for data protection A (104A) to generate a full backup of host component A (102A) data by taking an incremental backup and merging the incremental backup into a previously generated full backup obtained from the backup storage (130, FIG. 1A) given that data protection agent A (104A) and host component A (102A) include the functionality and compatibility to generate both full backups and incremental backups and to merge previously generated full backup with incremental backups. The local data protection manager (110) may use the add-on API (112) and the second add-on library to translate the generic data protection request associated with host component N (102N) into a host component specific data protection request, where the host component specific data protection request is a call for data protection N (104N) to generate a full backup of host component N (102N) data given that data protection agent N (104N) and host component N (102N) include the functionality and compatibility to only generate full backups.

Returning to the discussion of FIG. 1B, in one or more embodiments of the invention, the add-on API (112) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the add-on API (112) described throughout this application.

In one or more embodiments of the invention, the add-on API (112) is implemented as computer instructions, e.g., computer code, stored on a persistent storage that when executed by a processor of host A (100A) causes host A (100A) to provide the functionality of the add-on API (112) described throughout this application.

In one or more embodiments of the invention, the persistent storage (114) stores data. The persistent storage (114) may include a host A add-on library repository (116) and a host A host component metadata repository (118). The persistent storage (114) may include other and/or additional data without departing from the invention. Each of these data structures is discussed below.

In one or more embodiments of the invention, the host A add-on library repository (116) is one or more data structures that include all of the add-on libraries associated with the host components (102) of host A (100). Each host component may be associated with an add-on library. An add-on library may include information that may be used to translate generic data protection requests into host component specific data protection requests. The information may include, for example, a list of generic data protection requests and corresponding host component specific data protection requests. An add-on library may include other and/or different information without departing from the invention. The host A add-on library repository (116) may be updated and otherwise maintained by the local data protection manager (110) and may be used by the add-on API (112) to translate generic data protection requests as discussed above.

In one or more embodiments of the invention, the host A host component metadata repository (118) is one or more data structures that include host component entries. Each host component entry may be associated with a host component (e.g., 102A) of host A (100A). There may be any number of host entries included in the host A component metadata repository (118) without departing from the invention. Each host component entry may include information associated with a host component. The information may include, for example, a host component identifier (e.g., a unique combination of bits associated with a particular host component), host component functionality information (e.g., what data protection services may be provided to the host component), host component topology (instances of application systems, assets, etc.), data protection agent identifier (e.g., a unique combination of bits associated with a data protection agent), and an add-on library identifier (e.g., a unique combination of bits associated with an add-on library). The host A host component metadata repository (118) may be updated and otherwise maintained by the local data protection manager (110). The local data protection manager (110) may use the host A host component metadata repository (118) to provide local data protection management services. Host component metadata of the host A host component metadata repository (118) may be generated and/or obtained from data protection agents (104).

The persistent storage (114) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (114) may utilize portions of any combination of hard disk drives, solid state disk drives, tape drives, and/or any other physical storage medium of any number of computing devices.

Figure 1C:
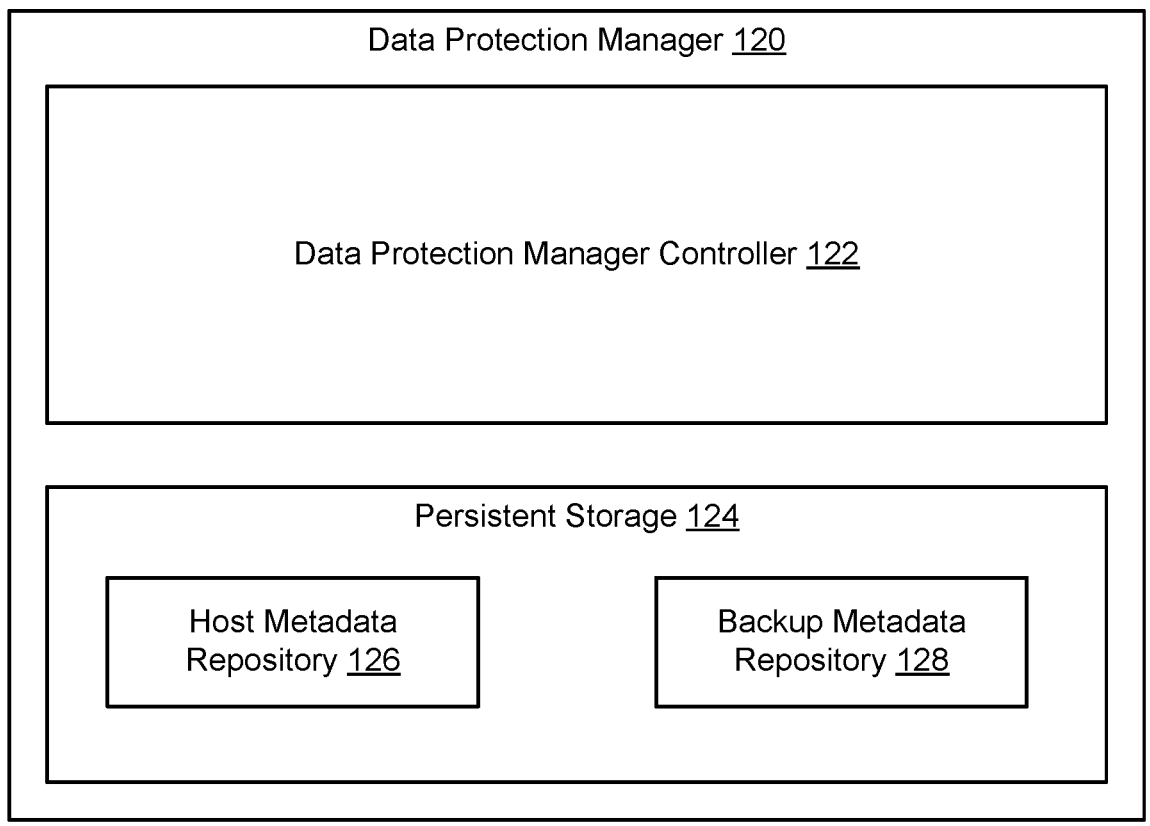
FIG. 1C shows a diagram of data protection manager in accordance with one or more embodiments of the invention.

FIG. 1C shows a diagram of data protection manager in accordance with one or more embodiments of the invention. The data protection manager (120) may be an embodiment of the data protection manager (120, FIG. 1A) discussed above. As discussed above, the data protection manager (120) provides data protection management services to the hosts (100, FIG. 1A). The data protection manager (120) may a data protection manager controller (122) and persistent storage (124). The data protection manager (120) may include additional, fewer, and/or different components without departing from the invention. Each of the aforementioned components is discussed below.

In one or more embodiments of the invention, the data protection manager controller (122) includes the functionality to perform the data protection management services provided by the data protection manager (120). The data protection management services may include (i) generating generic data protection requests based on user requests and/or protection policies, (ii) maintain a host metadata repository (126) (discussed below), and (iii) maintain a backup metadata repository (128) (discussed below). The data protection manager controller may include other and/or additional functionalities without departing from the invention.

In one or more embodiments of the invention, the data protection manager controller (122) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the data protection manager controller (122) described throughout this application.

In one or more embodiments of the invention, the data protection manager controller (122) is implemented as computer instructions, e.g., computer code, stored on a persistent storage that when executed by a processor of the data protection manager (120) causes the data protection manager (120) to provide the functionality of the data protection manager controller (122) described throughout this application.

In one or more embodiments of the invention, the persistent storage (124) stores data. The persistent storage (124) may include a host metadata repository (126) and a backup metadata repository (128). The persistent storage (124) may include other and/or additional data without departing from the invention. Each of these data structures is discussed below.

In one or more embodiments of the invention, the host metadata repository (126) is one or more data structures that includes host entries associated with the hosts (100, FIG. 1A). Each host entry may include information associated with each host in the system. The information included in the host metadata repository (126) may be an embodiment of the information discussed above in regards to the host A host component metadata repository (118, FIG. 1B).

In one or more embodiments of the invention, the backup metadata repository (128) is one or more data structures that includes information associated with backups of host component data. The backup information may include, for example, backup identifiers associated with backups, storage locations (e.g., a storage device identifier of the backup storage (130, FIG. 1A)) of backups, host component identifiers associated with the backups, and other and/or additional information associated with the backups generated and stored in the system. The backup metadata data repository (128) may include other and/or additional information without departing from the invention. The backup metadata repository may be updated by the data protection manager controller (122) during the performance of data protection services, and used by the data protection manager controller to perform at least a portion of data protection services (e.g., restoration of a host component using a backup).

The persistent storage (124) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (124) may utilize portions of any combination of hard disk drives, solid state disk drives, tape drives, and/or any other physical storage medium of any number of computing devices.

Figure 2A:
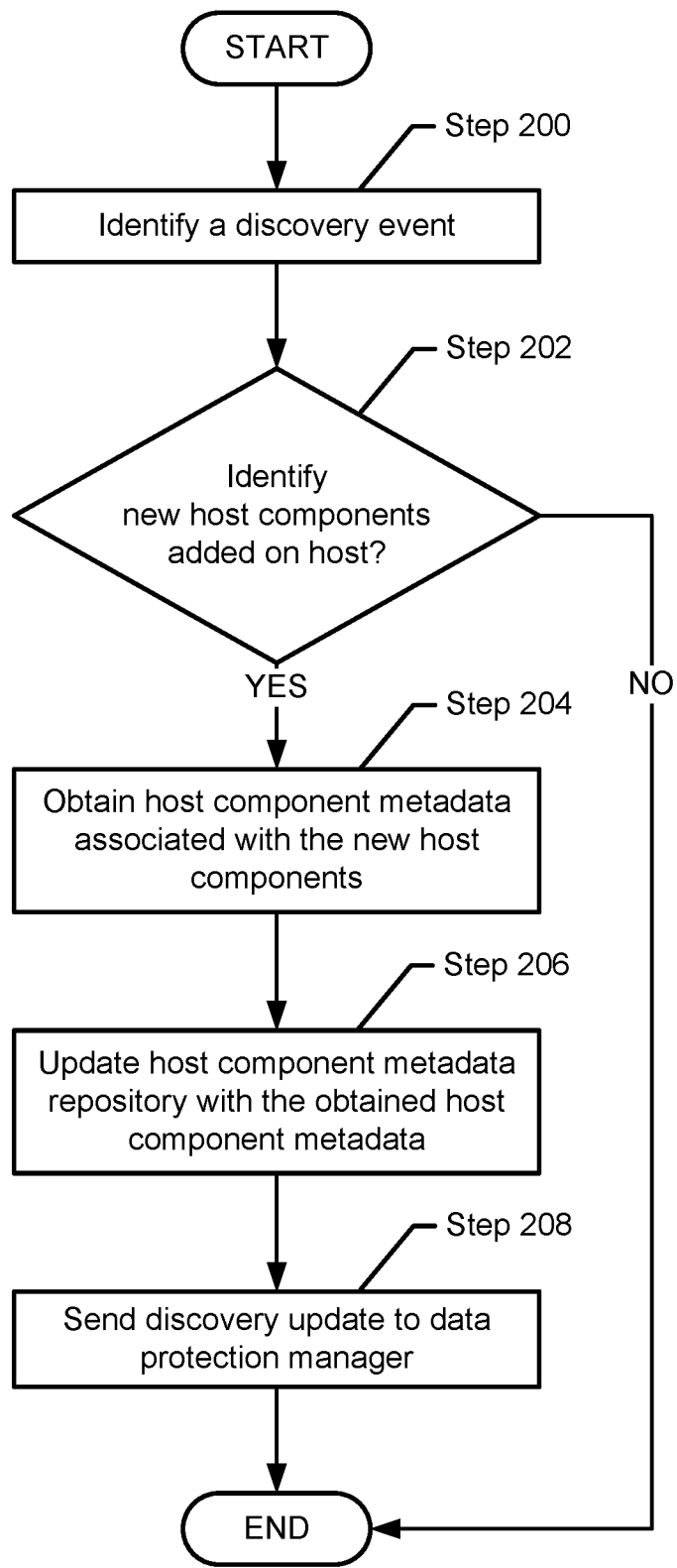
FIG. 2A shows a flowchart of a method of discovering host components in accordance with one or more embodiments of the invention.

FIG. 2A shows a flowchart of a method of discovering host components in accordance with one or more embodiments of the invention. The method shown in FIG. 2A may be performed by, for example, a local data protection manager (110, FIG. 1B). Other components of the system illustrated in FIGS. 1A-1C may perform all or a portion of the method of FIG. 2A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 200, a discovery event is identified. In one or more embodiments of the invention, the discovery event indicates that the local data protection manager is to discover the host components currently on a host. The discovery event may be a message obtained from the data protection manager that includes a request to discover all of the host components of the host. The local data protection manager may identify obtaining the aforementioned message as the discovery event. The data protection manager may generate and send the message to the local data protection manager in response to a request obtained from a user, or as part of a discovery schedule that specifies times to discover host components on hosts. The discovery event may be identified via other and/or additional methods without departing from the invention.

In step 202, a determination is made as to whether new host components are added onto the host. In one or more embodiments of the invention, local data protection manager determines whether new host components are added onto the host by comparing host component identifiers included in the host component metadata repository of the host with the host component identifiers of the host components discovered to be currently on the host. The local data protection manager may discover all the host components on the system by sending a message to all data protection agents that includes a request to provide a host component identifier of the host component to which the data protection agents are associated. After obtaining the discovered host component identifiers with the previously discovered host component identifiers obtained from the host component metadata repository of the host, the local data manager compares the list of discovered host component identifiers with the list of previously discovered host component identifiers. If the list of discovered host component identifiers includes host component identifiers not included in the list of previously discovered host component identifiers, then the local data protection manager may determine that new host components are added onto the host. If the list of discovered host component identifiers does not included host component identifiers not included in the previously discovered host component identifiers, then the local data protection agent may determine that new host components are not added onto the host. The determination as to whether new host components are added onto the host may be made via other and/or additional method without departing from the invention.

In one or more embodiments of the invention, a data protection agent may send a message notifying the local data protection manager that the data protection agent and its associated host component were added to the host after the data protection agent and host component were installed onto the host. The message may include the host component identifier associated with the installed host component. The local data protection manager may store these host component identifiers in a list of discovered host component identifiers in the host component metadata repository of the host. The local data protection manager may check the list of discovered host component identifiers to determine whether new host components were added. If host component identifiers are included in the list of discovered host component identifiers in the host component metadata repository of the host, then the local data protection manager may determine that new host components are added onto the host. If host component identifiers are not included in the list of discovered host component identifiers in the host component metadata repository (i.e., the list is empty) of the host, then the local data protection manager may determine that new host components are not added onto the host. The determination as to whether new host components are added onto the host may be made via other and/or additional method without departing from the invention.

If it is determined that new host components are added onto the host, then the method proceeds to step 204. If it is determined that new host components are not added onto the host, then the method may end following step 202.

In step 204, host component metadata associated with the new host component(s) is obtained. In one or more embodiments of the invention, the local data protection manager sends one or more messages to the data protection agents associated with the discovered host component identifiers. The messages may include requests to obtain host component metadata of the new host components associated with the discovered host component identifiers that were not included in the host component metadata repository of the host. In response to obtaining the messages, the data protection agents generate and/or obtain the host component metadata of the host components, and send the host component metadata to the local data protection manager. The host component metadata may also include the add-on library that is associated with the host component. The host component metadata associated with the new host components may be obtained via other and/or additional methods without departing from the invention.

In step 206, the host component metadata repository is updated with the obtained host component metadata. In one or more embodiments of the invention, the local data protection manager generates a host component entry associated with each new host component in the host component metadata repository of the host. The host component entry may include all, or a portion of the host component metadata obtained in step 204 associated with each host. Additionally, the local data protection manager may store the add-on library included in the host component metadata in the add-on library repository. The local data protection manager may delete the host component identifiers of new host components after the host component metadata repository is updated to prepare for newly discovered host components. The host component metadata repository may be updated with the obtained host component metadata via other and/or additional methods without departing from the invention.

In step 208, a discovery update is sent to the data protection manager. In one or more embodiments of the invention, the local data protection manager sends a message to the data protection manager. The message may specify that the new host components were added onto the host. The message may include the host component identifiers and other and/or additional host component metadata associated with the new host components without departing from the invention. The discovery update may be sent to the data protection manager via other and/or additional methods without departing from the invention.

The method may end following step 208.

Figure 2B:
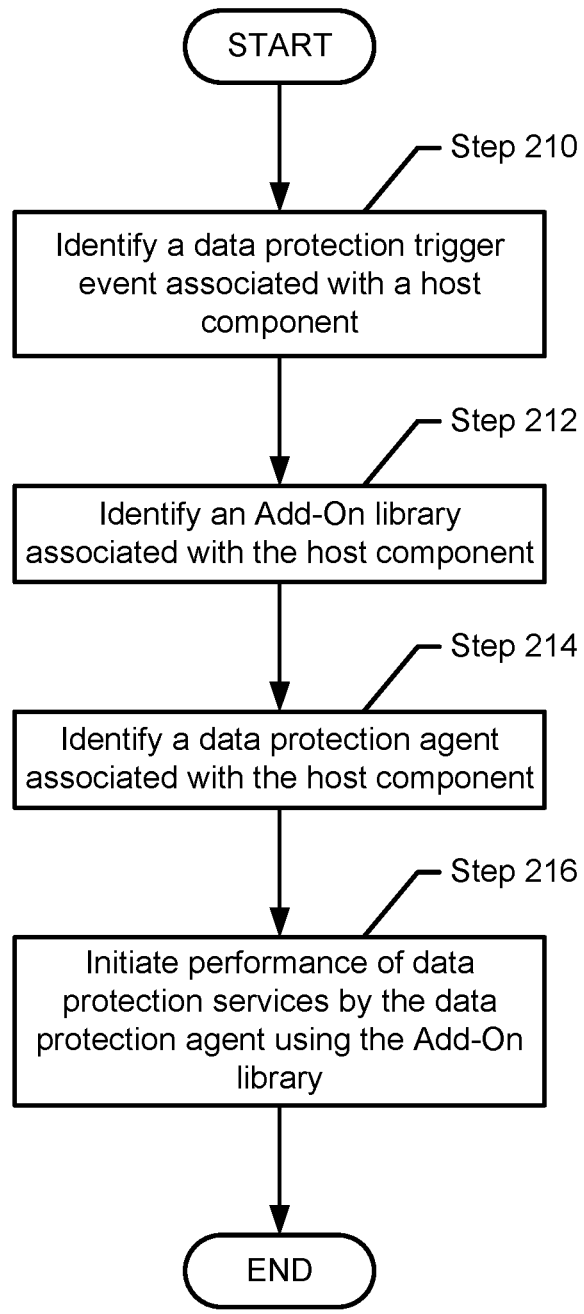
FIG. 2B shows a flowchart of a method of performing data protection services in accordance with one or more embodiments of the invention.

FIG. 2B shows a flowchart of a method of performing data protection services in accordance with one or more embodiments of the invention. The method shown in FIG. 2B may be performed by, for example, a local data protection manager (110, FIG. 1B). Other components of the system illustrated in FIGS. 1A-1C may perform all or a portion of the method of FIG. 2B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 210, a data protection trigger event associated with a host component is identified. In one or more embodiments of the invention, the data protection trigger event indicates that the local data protection manager is to data protection services on a host component of the host. The data protection trigger event may be a message obtained from the data protection manager that includes a generic data protection request. The generic data protection request may be, for example, to generate a backup of the host component. The generic data protection request may be a request to provide other types of data protection services without departing from the invention. The generic data protection request may include the host component identifier associated with the host components the generic data protection request targets. The local data protection manager may identify obtaining the aforementioned message as the data protection trigger event. The data protection manager may generate and send the message to the local data protection manager in response to a request obtained from a user, or as part of a data protection schedule of a protection policy that specifies times to perform data protection services for host components on hosts. The data protection trigger event may be identified via other and/or additional methods without departing from the invention.

In step 212, an add-on library associated with the host component is identified. In one or more embodiments of the invention, the local data protection manager identifies the add-on library associated with the host component using the host component metadata repository of the host. As discussed above, the host component metadata repository may include a host component entry. The host component entry may be identified using the host component identifier obtained in step 210. The host component entry may include the add-on library identifier of the add-on library that is associated with the host component. The local data protection manager may identify the add-on library associated with the add-on library identifier as the add-on library associated with the host component. The add-on library associated with the host component may be identified via other and/or additional methods without departing from the invention.

In step 214, a data protection agent associated with the host component is identified. In one or more embodiments of the invention, the local data protection manager identifies the data protection agent associated with the host component using the add-on library identified in step 212. The add-on library may include the data protection agent identifier of the data protection agent that is associated with the host component. The local data protection manager may identify the data protection agent associated with the data protection agent identifier as the data protection agent associated with the host component using the host component metadata repository of the host. The data protection agent associated with the host component may be identified via other and/or additional methods without departing from the invention.

In step 216, the performance of data protection services by the data protection agent is initiated using the add-on library. In one or more embodiments of the invention, the add-on API of the local data protection manager initiates the performance of data protection services by the data protection agent by translating the generic data protection request into a host component specific data protection request using the add-on library. As discussed above, the add-on library includes translations of generic data protection requests into host specific data protection requests, where the host component specific data protection requests include requests to preform data protection services that may be unique to the host component and the data protection agent associated with the host component. The add-on API of the local data protection manager may identify the host component specific data protection request that is associated with the generic data protection request obtained from the data protection manager using the add-on library. The add-on API of the local data protection manager may initiate the performance of the data protection services by sending the host component specific data protection request to the data protection agent. In response to obtaining the host component specific data protection request, the data protection agent may perform the data protection services for the host component. The performance of data protection services by the data protection agent may be initiated using the add-on library via other and/or additional methods without departing from the invention.

The method may end following step 216.

Example

The following section describes the operation of an example system over time.

Figure 3A:
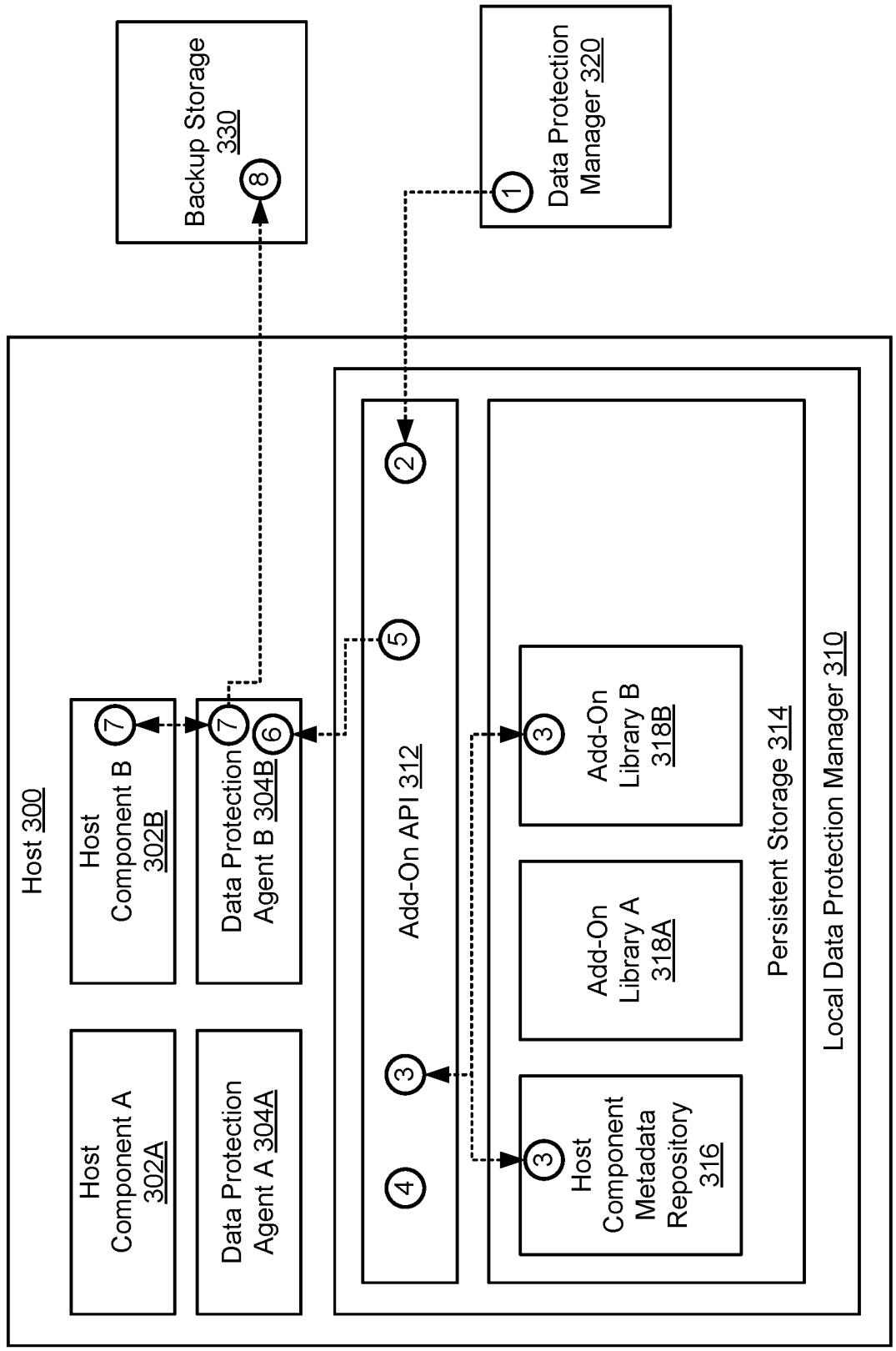
FIGS. 3A-3C show diagrams of the operation of an example system over time in accordance with one or more embodiments of the invention.
Figure 3B:
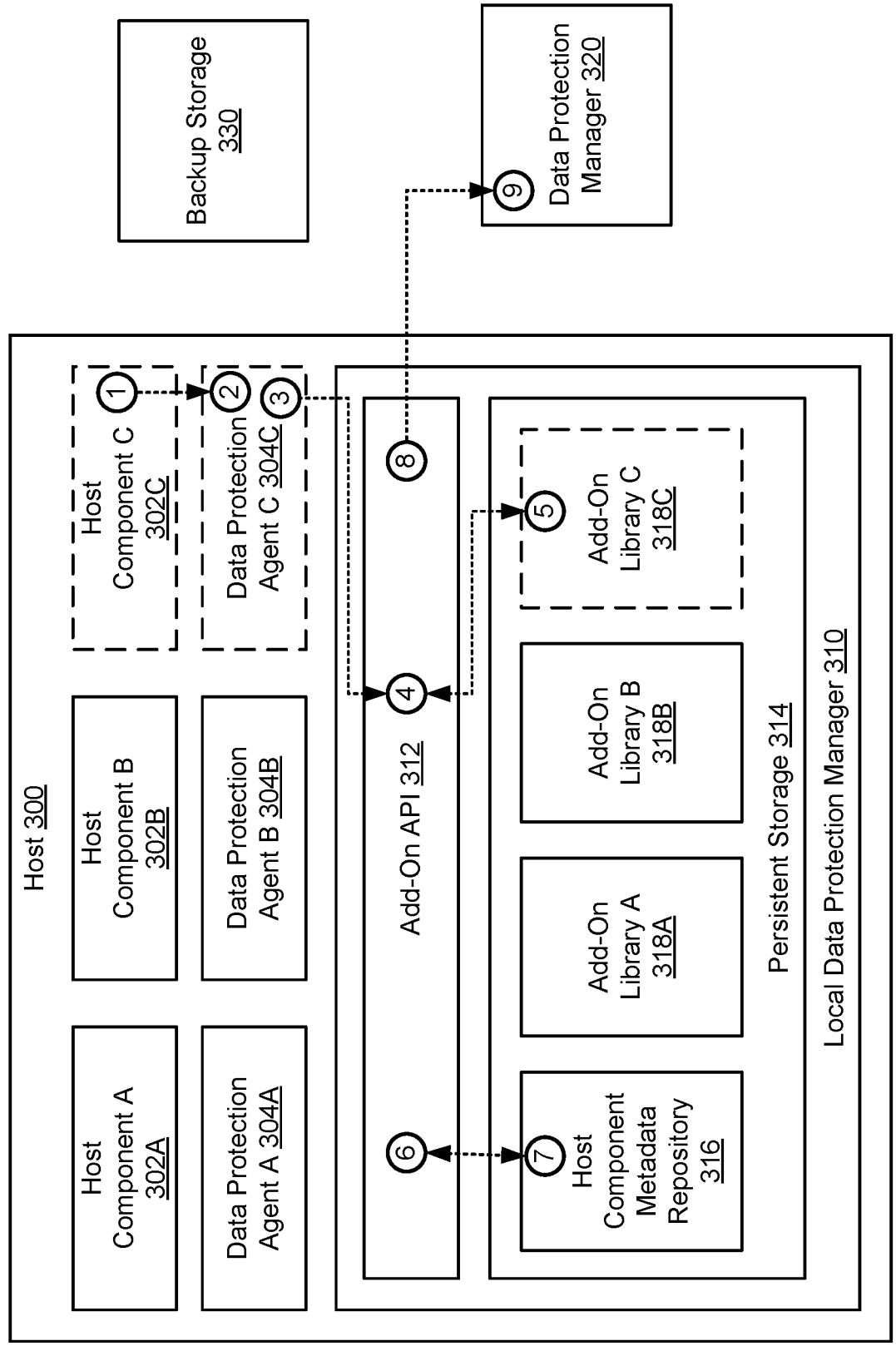
Figure 3C:
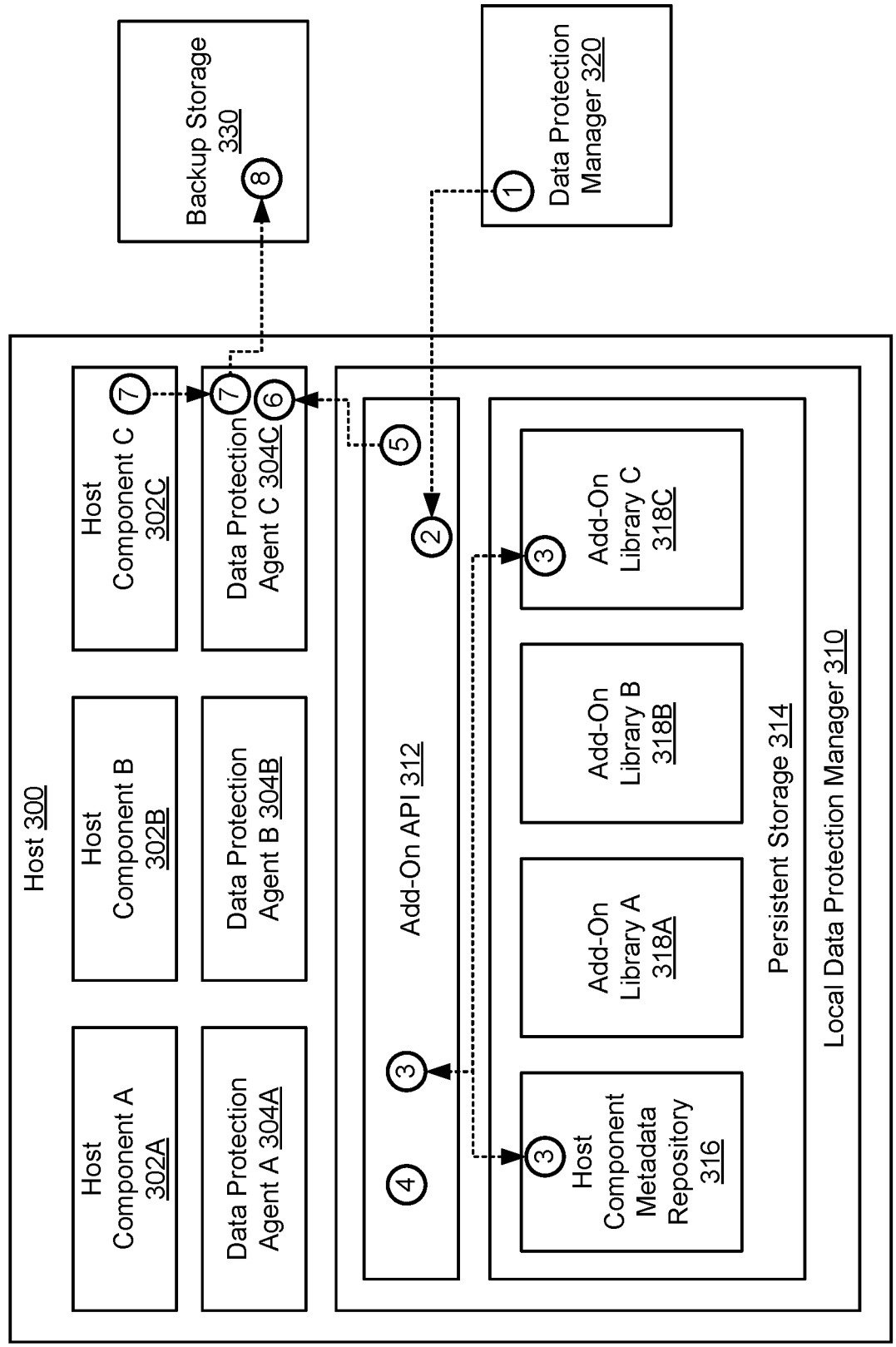

FIGS. 3A-3C show diagrams of the operation of an example system over time in accordance with one or more embodiments of the invention. The examples are not intended to limit the invention. Turning to FIG. 3A, consider a scenario in which an example system provides data protection services to a host component executing on a host.

The example system includes a host (300), a data protection manager (320) and a backup storage (330). The host (300) includes two host components, host component A (302A) and host component B (302B). Host component A (302A) is a database application executing on the host (300), and host component B (302B) is a file system executing on the host (300). The host (300) further includes data protection agent A (304A) and data protection agent B (304B).

Data protection agent A (304A) provides data protection services to host component A (302A) and data protection agent B (304B) provides data protection services to host component B (302B). The host further includes a local data protection manager (310) that provides local data protection management services to the host (300). The local data protection manager (310) includes an add-on API (312), which obtains, translates, and provides, and executes data protection services, and persistent storage (314), which stores data structures that are used by the local data protection manager (310) and its components to provide the aforementioned functionality. The data structures may include a host component metadata repository (316), and one or more add-on libraries such as add-on library A (318A) and add-on library B (318B).

At a first point in time, the data protection manager (320) generates a generic data protection request [1]. The generic data protection request includes a request to generate a backup of data generated by host component B (302B) of the host (300). After generating the data protection request, the data protection manager (320) sends the data protection request to the local data protection manager (310) [2]. In response to obtaining the data protection request, the add-on API (312) of the local data protection manager identifies that data protection agent B (304B) is associated with host component B (302B) using the host component metadata repository (316), and identifies that add-on library B (318B) is associated with host component B (302B) and obtains add-on library B (318B) from persistent storage (314) [3]. The add-on API (312) then translates the generic data protection request into a host component specific data protection request associated with host component B (302B) [4]. After generating the host component specific data protection request, the add-on API (312) then sends the host specific data protection request to data protection agent B (304B) and initiates the performance of the host specific data protection request [5]. In response to obtaining the host component specific data protection request, data protection agent determines (304B) that a host component specific backup associated with the functionality of data protection agent B (304B) and host component B (302B) is to be generated of the data generated by host component B (302B) [6]. Data protection agent B (304B) then obtains the data of host component B (302B) and generates a host component specific backup of the data [7]. Finally, data protection agent B (304B) sends the host component specific backup to the backup storage (330), where the host component specific backup is stored [8].

Turning to FIG. 3B, consider a scenario in which a new host component is installed on the host of the example system. The components of the example system are the same as the components of the example system in FIG. 3A. The events depicted in FIG. 3B occur at some point in time after the events depicted in FIG. 3A.

At a first point in time, host component C (302C) and data protection agent C (304C) are installed on the host (300) [1]. Host component C (302C) is an email application with different functionalities than host component A (302A) and host component B (302B). Data protection agent C (304C) obtains host component metadata associated with host component C (302C) [2]. The host component metadata includes information associated with host component C (302C) and the add-on library associated with host component C (304C). Data protection agent C (304C) then sends the host component metadata to the add-on API (312) of the local data protection manager (310) [3]. In response to obtaining the host component metadata, the add-on API (312) identifies the add-on library included in the host component metadata, which is add-on library C (318C) [4]. The add-on API (312) stores add-on library C (318C) in persistent storage (314) [5]. After storing add-on library C (318C) in persistent storage (314), the add-on API (312) determines that there is no host component entry in the host component metadata repository (316) associated with the host component C (302C) [6]. The add-on API (312) stores updates the host component metadata repository (316) to include a host component entry associated with host component C (302C) [7]. Moreover, the add-on API (312) sends a notification to the data protection manager (320) that notifies the data protection manager that host component C (302C) is installed on the host (300) [8]. The notification includes host component metadata associated with host component C (302C). The data protection manager (320) updates a host metadata repository (not shown) to include the host component metadata associated with host component C (302C) [9]. Best Turning to FIG. 3C, consider a scenario in which data protection services are performed for the newly installed host component on the host of the example system. The components of the example system are the same as the components of the example system in FIGS. 3A-3B. The events depicted in FIG. 3C occur at some point in time after the events depicted in FIG. 3B.

At a first point in time, the data protection manager (320) generates a generic data protection request [1]. The generic data protection request includes a request to generate a backup of data generated by host component C (302C) of the host (300). After generating the data protection request, the data protection manager (320) sends the data protection request to the local data protection manager (310) [2]. In response to obtaining the data protection request, the add-on API of the local data protection manager identifies that data protection agent C (304C) is associated with host component C (302C) using the host component metadata repository (316), and identifies that add-on library C (318C) is associated with host component C (302C) and obtains add-on library C (318C) from persistent storage (314) [3]. The add-on API (312) then translates the generic data protection request into a host component specific data protection request associated with host component C (302C) [4]. After generating the host component specific data protection request, the add-on API (312) then sends the host specific data protection request to data protection agent C (304C) and initiates the performance of the host specific data protection request [5]. In response to obtaining the host component specific data protection request, data protection agent determines (304C) that a host component specific backup associated with the functionality of data protection agent C (304C) and host component C (302C) is to be generated of the data generated by host component C (302C) [6]. Data protection agent C (304C) then obtains the data of host component C (302C) and generates a host component specific backup of the data [7]. Finally, data protection agent C (304C) sends the host component specific backup to the backup storage (330), where the host component specific backup is stored [8].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of managing data protection services for hosts in a system. Embodiments of the invention relate to using an add-on application programming interface (API) and an add-on library to provide data protection services to host components of hosts. A local data protection manager may use the add-on API and an add-on library to translate generic data protection requests into host component specific data protection requests. This may enable a single data protection manager to efficiently provide data protection management services to hosts with different types of host components and different types of functionalities, therefore improving the use of computing resources to provide data protection services to hosts.

In traditional systems, each type of host component on a host may require unique and different data protection services, resulting in an inefficient use of computing resources to provide data protection services. Embodiments of the invention allow for a single data protection manager to provide data protection services to multiple types of host components, each with unique and different functionalities. Thus, embodiments of the invention may address the problem of inefficient use of computing resources to provide data protection services to hosts in a system. This problem arises due to the technological nature of the environment in which the hosts are managed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A system for providing data protection services for data generated by host components hosted by hosts, comprising:
    persistent storage; and
    a local data protection manager executing on a host of the hosts programmed to:
        identify a data protection trigger event associated with a host component hosted by the host;
        identify an add-on library associated with the host component;
        identify a data protection agent associated with the host component; and
        initiate performance of data protection services by the data protection agent using the add-on library.

2. The system of claim 1, wherein the host components comprises:
    file systems; and
    applications.

3. The system of claim 1, wherein identifying the data protection trigger event comprises:
    obtaining a generic backup generation request from a data protection manager targeting data generated by the host component.

4. The system of claim 3, wherein initiating the performance of data protection services comprises:
    translating the generic backup generation request to an host component specific backup generation request using the add-on library; and
    sending the host component specific backup generation request to the data protection agent.

5. The system of claim 4, wherein the data protection services comprise generating a backup of the data.

6. The system of claim 3, wherein the data protection agent does not include functionality to perform the data protection services based on the generic backup generation request.

7. The system of claim 5, wherein the data protection agent includes functionality to perform the data protection services based on the host component specific backup generation request.

8. The system of claim 1, wherein the local data protection manager is further programmed to:
    prior to identifying the data protection trigger event:
        identify a discovery event;
        make a determination that the host component is added on the host;
        in response to the determination:
            obtain host component metadata associated with the host component;
            update a host component metadata repository using the host component metadata to obtain a host component entry associated with the host component; and
            send a discovery update to a data protection manager.

9. The system of claim 8, wherein the host component metadata comprises:
    an host component type associated with the host component;
    host component topology associated with the host component; and
    host component functionality information associated with the host component.

10. The system of claim 8, wherein identifying the add-on library associated with the host component comprises:
    identifying the add-on library associated with the host component using the host component entry.

11. The system of claim 10, wherein identifying the data protection agent associated with the host component comprises:
    identifying the data protection agent associated with the host component using the add-on library.

12. A method for providing data protection services for data generated by host components hosted by hosts, comprising:
    identifying a data protection trigger event associated with a host component hosted by the host;
    identifying an add-on library associated with the host component;
    identifying a data protection agent associated with the host component; and
    initiating performance of data protection services by the data protection agent using the add-on library.

13. The method of claim 12, wherein the host components comprises:
    file systems; and
    applications.

14. The method of claim 12, wherein identifying the data protection trigger event comprises:
    obtaining a generic backup generation request from a data protection manager targeting data generated by the host component.

15. The method of claim 14, wherein initiating the performance of data protection services comprises:
    translating the generic backup generation request to an host component specific backup generation request using the add-on library; and
    sending the host component specific backup generation request to the data protection agent.

16. The method of claim 14, wherein the data protection services comprise generating a backup of the data.

17. A non-transitory computer readable medium comprising computer readable program code, which when executed by a computer processor enables the computer processor to perform a method for storing data, the method comprising:
    identifying a data protection trigger event associated with a host component hosted by the host;
    identifying an add-on library associated with the host component;
    identifying a data protection agent associated with the host component; and
    initiating performance of data protection services by the data protection agent using the add-on library.

18. The non-transitory computer readable medium of claim 17, wherein the host components comprises:

file systems; and
applications.

19. The non-transitory computer readable medium of claim 17, wherein identifying the data protection trigger event comprises:
    obtaining a generic backup generation request from a data protection manager targeting data generated by the host component.

20. The non-transitory computer readable medium of claim 19, wherein initiating the performance of data protection services comprises:
    translating the generic backup generation request to an host component specific backup generation request using the add-on library; and
    sending the host component specific backup generation request to the data protection agent.

* * * * *